United States Patent
Emanuel et al.

[11] 3,731,540
[45] May 8, 1973

[54] APPARATUS FOR STATIC AND DYNAMIC WHEEL BALANCING

[75] Inventors: Giovanni Emanuel; Lucio Bertoni, both of Turin, Italy

[73] Assignees: Emanuel-Fi.s.mec. S.p.A.; Ferom S.n.c. di Bertoni Lucio e Ferretti Mario, Turin, Italy

[22] Filed: Oct. 14, 1971

[21] Appl. No.: 189,115

[30] Foreign Application Priority Data

Oct. 27, 1970    Italy..................53728 B/70

[52] U.S. Cl..................................73/457, 73/71.2
[51] Int. Cl..........................G01m 1/22, G01m 1/28
[58] Field of Search...............73/71.2, 71.4, 457, 73/459, 466

[56] References Cited

UNITED STATES PATENTS

| | | | |
|---|---|---|---|
| 2,754,679 | 7/1956 | Petroff | 73/71.4 |
| 2,955,232 | 10/1960 | Hosking et al. | 73/457 X |
| 2,798,379 | 7/1957 | Merrill et al. | 73/457 |
| 3,304,787 | 2/1967 | Chiku et al. | 73/517 R |
| 2,671,202 | 3/1954 | Petroff | 73/466 X |
| 3,078,720 | 2/1963 | Hofmann | 73/457 |

*Primary Examiner*—James J. Gill
*Attorney*—Sughrue, Rothwell, Mion, Zinn & Macpeak

[57] ABSTRACT

Wheel balancing apparatus capable of performing static and dynamic wheel balancing in a single operation is disclosed. The apparatus has two mutually perpendicular transducers in a sensor which is readily attachable to the suspension of the wheel by means of a magnet or a clamp. The outputs of the sensors are selectively coupled to an amplifier and to an adjustable circuit which provides a stroboscopic illumination triggered by the vibration of the wheel, a visual display of the amount of imbalance of the wheel indicating the weight required to compensate for the imbalance, and an alarm signal if the speed at which the wheel is driven during testing exceeds a preselected maximum value to which the apparatus has been set by the operator.

5 Claims, 6 Drawing Figures

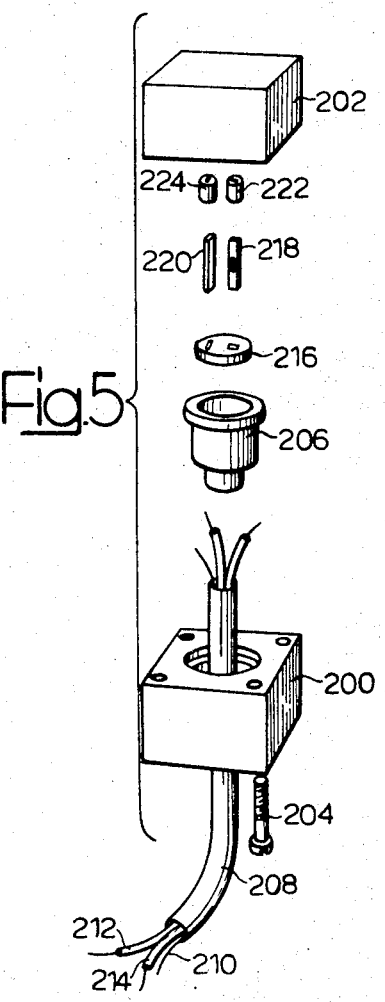
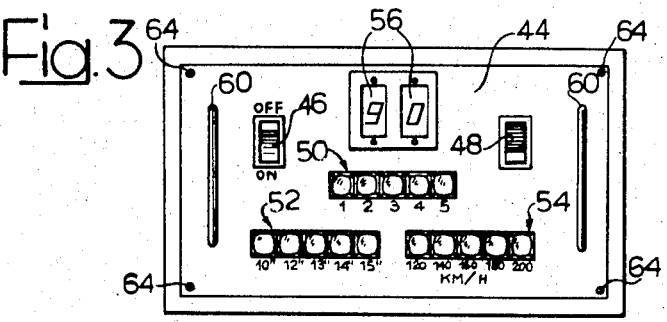
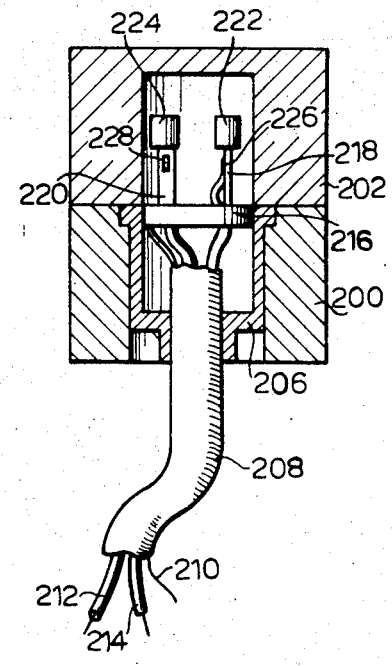

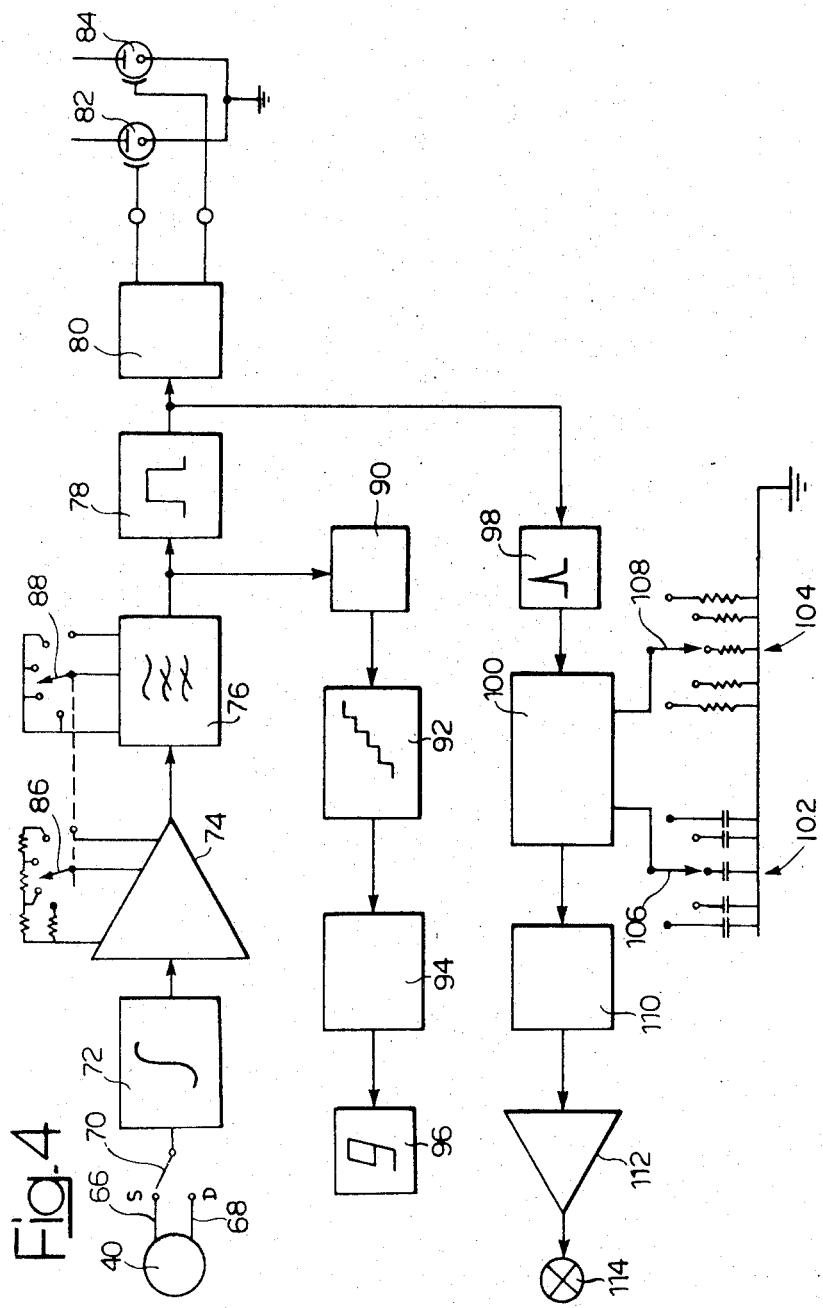

APPARATUS FOR STATIC AND DYNAMIC WHEEL BALANCING

BACKGROUND OF THE INVENTION

The present invention relates to wheel balancing, and particularly to improved apparatus for both static and dynamic balancing of wheels while they are mounted on a vehicle.

Wheel balancing apparatus, as such, is already known in the art. Known wheel balancing apparatus usually comprises means for spinning a wheel of a vehicle which has been raised up from the ground, a device, which is applied to a point of the wheel suspension, for detecting the vibrations of the suspension during the rotation of the wheel, and a lighting arrangement which stroboscopically illuminates the wheel during its rotation, the stroboscopic light operating under the control of initiation signals which are produced by a suitable circuit such as from a speed signal supplied by the vibration detecting device.

In such known wheel balancing apparatus an electromagnetic arrangement for detecting the vibrations of the wheel has generally been employed; such arrangements, however, are only capable of ascertaining the vibrations of the wheel in a single direction and thus are suitable only for dynamic or static balancing of the wheel at any one time since they require at least two successive operations in order to determine the vibrations of the wheel in two different directions. Moreover, previously known wheel balancing apparatus has been rather bulky and the vibration sensitive devices require to be attached to a fixed point such as a support on the ground, in order to detect the displacements of the wheel suspension with respect to the fixed point. The support usually comprises a foot supported on the ground from which there extends an arm carrying at its end the electromagnetic sensor. With such an arrangement each wheel balancing operation involves a separate adjustment of the length and position of the arm; in addition the foot of the vibration sensitive device must be moved along the ground to bring the sensor at the end of the arm into the correct position with respect to the desired point on the suspension of the wheel.

Moreover, in such known apparatus the speed of rotation of the wheel under test is not normally properly controlled. The operator starts the wheel rotating at a more or less arbitrary speed and takes the measurements involved in the particular case. However, since such apparatus is often used by unskilled workers, it frequently happens that the wheel is driven at an unsuitable, or even unacceptable speed in relation to the vehicle on which it is mounted. This arises because the driving equipment is normally constructed so as to be capable of testing wheels of a large range of sizes, from relatively large wheels which must be tested at a relatively high speed down to quite small wheels for small vehicles which do not require to be tested at such high speeds. Therefore, if the speed of rotation is not controlled, smaller wheels may be driven at very high speeds with the result that damage to the suspension of the wheels is likely.

Moreover, if the speed of rotation of the wheel under test cannot be controlled, as in previously known wheel balancing apparatus, there is no possibility of selecting with any precision an ideal speed of rotation of the wheel in order to carry out various checks on the suspension of the wheel, which suspension may have an anomalous behavior at certain critical speeds.

OBJECTS OF THE INVENTION

It is one object of the present invention to provide apparatus for static and dynamic wheel balancing which is capable of detecting both the static and dynamic imbalance in a wheel in a single operation.

It is another object of this invention to provide apparatus for static and dynamic wheel balancing which can operate on wheels while they remain installed on vehicles.

It is a further object of the invention to provide apparatus for static and dynamic wheel balancing which can simultaneously detect imbalance in two different directions.

It is yet another object of the present invention to provide apparatus for static and dynamic wheel balancing which can overcome the disadvantage of previously known static and dynamic wheel balancing apparatus in that the detecting device of the invention may be applied to the desired part of the suspension of the wheel without the need for external fixed support points.

It is yet a further object of the invention to provide apparatus for static and dynamic wheel balancing while the wheel is installed on a vehicle, which is equipped with a small vibration detection device, and which is capable of controlling the maximum speed of rotation of the wheel.

Another object of this invention is to provide apparatus for static and dynamic wheel balancing of wheels while they are installed on a vehicle, in which the sensitivity can be adjusted in dependence on the magnitude of the vibrations of the suspension of the wheel, to enable accurate and convenient detection of vibrations of suspensions having various degrees of rigidity, and to take into account various different degrees of imbalance on the wheel.

SUMMARY OF THE INVENTION

According to the present invention, therefore, there is provided apparatus for static and dynamic balancing of a vehicle wheel comprising sensor means sensitive to the vibration of at least one part of the suspension of the wheel, comprising two transducers each sensitive to vibrations in a different direction, an integrator for integrating the output signal from a selected transducer of the sensor means, an amplifier for amplifying the output signal from the said integrator, and a squaring circuit for shaping the output signal from the said amplifier, to control the excitation of at least one lamp for stroboscopic illumination of the wheel.

The invention and its particular features and advantages will become more apparent from the following description which is given purely by way of example.

BRIEF DESCRIPTION OF THE DRAWINGS

FIG. 3 is a plan view of the control panel of the apparatus shown in FIG. 1;

FIG. 4 is a schematic block diagram of the apparatus shown in FIGS. 1 and 2;

FIG. 5 is an exploded perspective view illustrating a detector forming part of the embodiment of the invention; and FIG. 6 is a sectional view of the detector illustrated in FIG. 4.

DESCRIPTION OF THE PREFERRED EMBODIMENT

Figure 1:
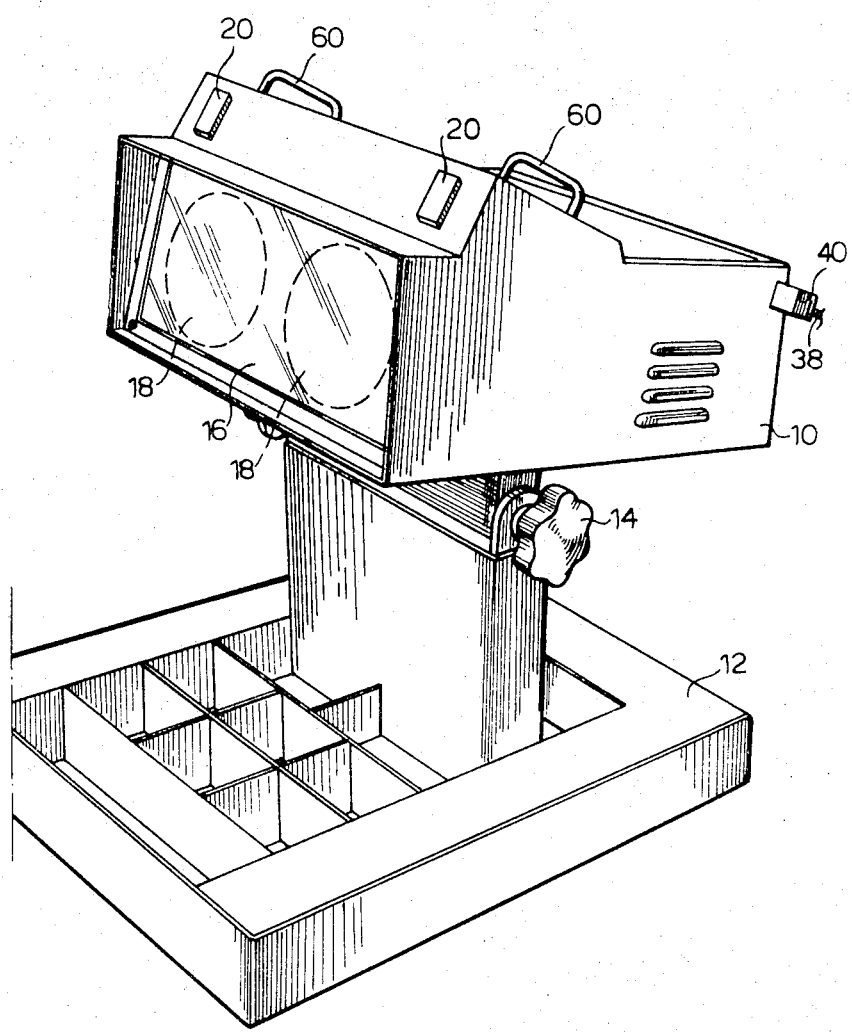
FIG. 1 is a perspective view of wheel balancing apparatus constructed as an embodiment of this invention.
Figure 2:
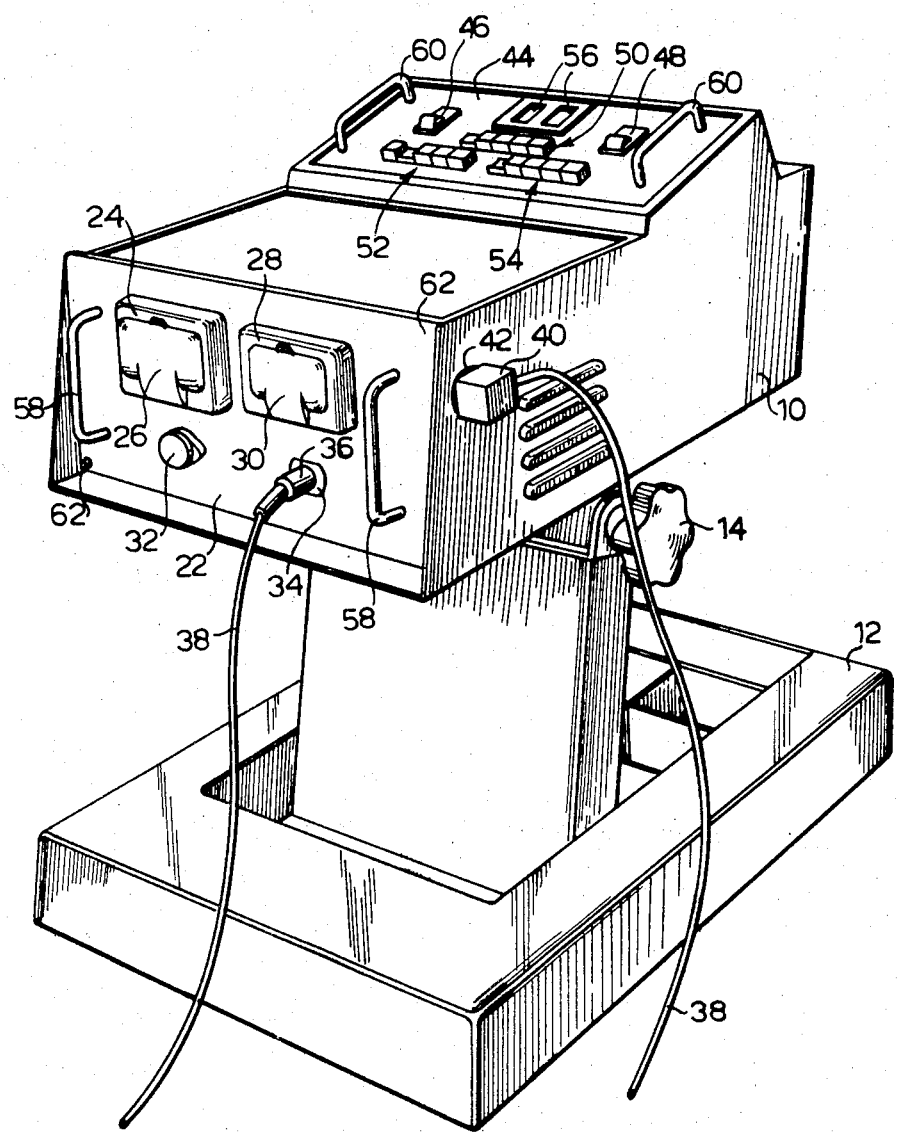
FIG. 2 is a perspective rear view of the embodiment illustrated in FIG. 1.

Referring now to FIGS. 1 and 2 of the drawings the embodiment of the invention comprises a casing 10 which is supported on a base 12 via a pedestal to which the casing is connected by means of a horizontal pivot which can be clamped to hold the casing 10 in any desired operating inclination by an operating handle 14. The base 12 is carried on small rollers (not shown) which allow the apparatus to be moved about readily.

The casing 10 has a translucent panel 16 at the front through which light from two flash lamps 18 may pass on to a wheel (not shown) to be balanced. The flash lamps 18 of the embodiment are gas discharge lamps. At the front the casing 10 is also equipped with two monitor lamps 20 which are used, in a manner which will be described in greater detail below, for detecting when the wheel has reached a predetermined maximum speed of rotation.

A rear panel 22 on the casing 10 is provided with a socket 24 for receiving a network supply plug (not shown). The socket 24 is protected, when not in use, by a hinged cover 26. The rear panel 22 also carries another socket 28, again protected by a hinged cover 30, to take a plug carrying the supply for a motor carriage for rotating the wheel to be balanced. A plug 32 covers a fuse housing.

Another socket 34 takes a plug 36 which is connected to a cable 38 which leads from a detector or sensor 40 for detecting accelerations of the suspension of the wheel under test. The detector 40 is held by means of a magnet 42 to an arbitrary point on the casing 10 when not in use, and when in use is fixed by means of the magnet 42 to a point of suspension of the wheel to be balanced. The detector 40 will be described in greater detail below. A top panel 44 on the casing 10 carries (see also FIG. 3) an on-off switch 46 for switching the apparatus on or off, and a change-over switch 48 for selection of the type, that is static or dynamic, of balancing operation to be performed. Three sets of push buttons 50, 52 and 54 control respectively the setting of the degree of sensitivity of the apparatus, the setting of the diameter of the wheel, and the maximum desired speed for testing the wheel. The circuits controlled by the push buttons 50, 52 and 54 and by the switches 46 and 48 are illustrated schematically in FIG. 4.

The panel 44 also carries two small display devices 56 for showing a number indicating the degree of imbalance of the wheel under test, to provide an approximate guide to the selection of the value of the lead counter-weights to be attached to the rim of the wheel to correct for the imbalance. The two panels 22 and 44 are also provided with handles respectively 58 and 60 by means of which the panel can be removed form the casing 10, the circuits being supported by the panels, for periodic maintenance or for repair. The panels 22 and 44 are held in position on the casing 10 by screws 62 and 64.

With reference now to FIG. 4 the detector 40 has two output lines 66 and 68 which carry signals representing vibration displacements in a direction parallel to the plane of the wheel and in a direction perpendicular to the plane of the wheel which are useful respectively for static and dynamic balancing of the wheel. A change-over switch 70 enables a selected one of the signals to be applied to an integrator 72 to effect static or dynamic balancing to be undertaken. The output signal from the detector 40 is, in fact, an acceleration signal and the detector 40 is an accelerometer. Since the balancing of the wheels is effected on the basis of signals representing the vibration of their suspensions, it is necessary to integrate the signal from the detector 40 in the integrator 72, in order to obtain a speed signal. The output signal of the integrator 72 is passed to an amplifier 74 and thence to a high-pass filter 76 which cuts out the lower frequencies, say up to 1 Hz, under normal working conditions, to substantially eliminate the direct component of the signal.

The output signal from the high-pass filter 76 is applied to a squaring circuit 78 which shapes the signal and applies a train of square pulses to a circuit 80 to control the flash lamps 82 and 84 so that the steep leading edges of the square pulses trigger the flash lamps 82, 84 to stroboscopically illuminate the wheel in rotation; the light from the lamps falls upon the periphery of the wheel on which there will previously have been made a reference mark such as a chalk mark.

A change-over switch 86 permits the sensitivity of the apparatus to be varied to take account of different degrees of imbalance and/or different degrees of rigidity of the suspensions of different vehicle, by regulating the gain of the amplifier 74. A second change-over switch 88 operates to change the cut-off frequency of filter 76, varying it up to about 30 Hz; the switches 86 and 88 are linked so that the highest cut-off frequency corresponds with the position of maximum gain of the amplifier 74, and thus maximum sensitivity of the apparatus, for the purposes of diagnosing faults in the suspensions, and in particular for ascertaining the presence of anomalies in the bearings. The relatively high cut-off frequency when linked to a suitably selected speed of rotation of the wheel, in fact, excludes from the signal the vibration components due solely to imbalance of the wheel while, owing to the greater sensitivity of the apparatus, any disturbances at a higher frequency will be detected; such disturbances may be due, for instance, to irregularities such as broken balls or rollers or the like, in a wheel bearing.

The double change-over switches 86, 88 diagrammatically illustrated in the block diagram FIG. 4 as rotating switches are, in fact, push button switches controlled by the push buttons 50 of FIG. 3.

The output signal of the high-pass filter 76 is also applied to a peak detector 90 the output of which is a direct signal the amplitude of which is equal to the amplitude of the alternating signal which it receives at the input. A ten-level discriminator 92 enables subdivision of the output signal from the peak detector 90 into ten separate levels, to provide a digital signal which, when suitably decoded by the decoder 94, serves to control a digital display device 96. The display device 96 has a display window 56 (FIG. 3) in which can be displayed a number approximately representing the degree of imbalance of the wheel to serve as guide in selection of the value of the counterweight to be applied to the rim of the wheel.

The output signal of the squaring circuit 78 is also applied to a differentiating rectifier 98, which applies prohibition pulses to an astable multivibrator 100, which normally oscillates at a predetermined frequency, but which is blocked when the frequency of the pulses supplied by the differentiating rectifier 98 reaches or exceeds its normal oscillation frequency. The normal oscillation frequency of the astable multivibrator 100 corresponds to a preselected maximum speed of rotation of the wheel to be balanced and can be set as described below.

A bank of condensers 102 and a bank of resistors 104 may be connected in pairs into the circuit in any combination by means of two independent switches 106 and 108 to fix the time constant of the multi-vibrator 100 and thus its oscillation frequency. This oscillation frequency determines the maximum value of the preselected speed of rotation of the wheel as described above. Again, the switches 106 and 108 are push button switches such as the switches 52 and 54 (FIG. 3) and they determine respectively the diameter of the wheel and the maximum speed at which it is desired that the wheel should be driven during testing.

When the multivibrator 100 is blocked, one of its anode outputs is held at a high voltage; this is detected by a sensor 110 and the output is connected to an amplifier 112 to excite monitor lamps such as the lamp 114, which corresponds to the lamp 20 in FIG. 3.

With reference to FIGS. 5 and 6 a preferred embodiment of the vibration detector 40 will be described. This detector is preferably of the a strain-gage type, shown in FIGS. 1, 2 and 4. The casing for the detector 40 is formed in two parts 200 and 202, which are connected by screws such as 204. Inside the casing there is a connector support collar 206 which acts as terminal for a cable 208 comprising an earthed cover 210, and two insulated conductors 212 and 214. The connector support collar 206 holds a plate 216 in which there are two mutually perpendicular slots which receive the ends of two flexible strips 218 and 220. To the other ends of the strips 218 and 220 there are fixed two masses 222 and 224 respectively. Because of their arrangement, the strips 218 and 220 can each vibrate substantially in only one plane, the two planes being mutually perpendicular. To the strips 218, 220 there are fixed in a known manner, two strain gages 226, 228 respectively. The output lines from the strain gages 226, 228 are connected respectively to the conductors 212 and 214 of the cable 108.

The detector 40 may also be provided with a magnet (not shown) on one face of one of the halves of the outer casing 200–202 of the detector, for fixing the detector 4 to the suspension of the wheel to be balanced: such suspensions are normally of ferromagnetic material. If the suspension is not of ferromagnetic material the detector 40 may be fixed to it by means of a simple clamp (not shown). As is known, static imbalance shows itself as vibration in the plane of a wheel and dynamic imbalance is manifest as vibrations perpendicular to the plane of the wheel. With this embodiment it is possible to detect either static or dynamic imbalance readily if the sensor 40 is placed on the suspension in a predetermined orientation with respect to the wheel, that is with one of the strips parallel to and one perpendicular to the plane of the wheel. It is possible to provide resolving circuits which would allow the sensor to be placed in a random orientation and which could resolve components of the two signals representing vibrations parallel to and perpendicular to the wheel.

OPERATION

When it is desired to balance a wheel the operator switches on the apparatus by means of the switch 46, selects the type of balancing (static or dynamic) which it is desired to perform, by means of the switch 48, sets the desired sensitivity of the apparatus with the push button set 50 in dependence on the type of vehicle on which the wheel to be balanced is mounted, sets the push buttons 52, 54 in dependence on the diameter of the wheel to be tested and the maximum speed likely to be encountered by the vehicle. The detector 40 is then attached to a suitable point of the suspension by means of the magnet or clamp, and the device (not shown) for spinning the wheel to be tested is started: this device comprises a motor which moves a roller kept in frictional engagement with the tire of the wheel. The lamps 18 will then stroboscopically illuminate the wheel and the reference mark made on it, while in the windows 56 will appear a number approximately representing the amount of imbalance of the wheel. The operator will then be able to tell, from the preselected sensitivity of the apparatus, the best value for the counterweight to be applied to the tire, while the lamps 18 will identify the position in which the counterweight should be fixed; this is similar to the procedure with previously known wheel balancing apparatus. If the maximum allowable speed of rotation of the wheel is exceeded, that is the maximum speed with respect to its diameter set on the push button set 52, and with respect to the maximum speed of the particular vehicle, set on the push button set 54, the monitor lamps 20 will light to enable the attendant to brake or stop the motor.

What is claimed is:

1. An apparatus for static and dynamic balancing of a vehicle wheel; said apparatus comprising in combination:

sensor means sensitive to vibration of at least one part of the suspension of the wheel under test, said sensor means including two transducers sensitive to vibrations in respective different directions, selector means for selecting an output signal from either one or the other of said transducers, integrator means coupled to said selector means, for integrating the output signal from a selected one of said transducers of said sensor means, amplifier means coupled to the output of said integrator means, for amplifying the output signal from said integrator means, squaring means coupled to the output of said amplifier means for shaping the output signal from said amplifier means, at least one lamp coupled to the output of said squaring means for stroboscopic illumination of the wheel under test, and a filter coupled to said amplifier, said filter having an adjustable low cut off frequency which can be used in the diagnosis of faults in the suspension of the said wheel.

2. An apparatus for static and dynamic balancing of a vehicle wheel; said apparatus comprising in combination:
 sensor means sensitive to vibration of at least one part of the suspension of the wheel under test, said sensor means including two transducers sensitive to vibrations in respective different directions,
 selector means for selecting an output signal from either one or the other of said transducers,
 integrator means coupled to said selector means, for integrating the output signal from a selected one of said transducers of said sensor means,
 amplifier means coupled to the output of said integrator means, for amplifying the output signal from said integrator means,
 squaring means coupled to the output of said amplifier means for shaping the output signal from said amplifier means,
 at least one lamp coupled to the output of said squaring means for stroboscopic illumination of wheel under test,
 means coupled to the output of said squaring means for adjusting the circuit with regard to the diameter of the wheel to be tested and with regard to the desired maximum speed at which the wheel is to be driven during the test, and
 means for providing an indication when the speed of rotation of the wheel reaches the said predetermined maximum during the test.

3. The apparatus of claim 2 wherein said means for adjusting said circuit include an astable multivibrator and means for adjusting the time constant of the multivibrator to modify the oscillation frequency thereof.

4. The apparatus of claim 3 wherein said means for adjusting the time constant of said astable multivibrator comprise a bank of capacitors and a bank of resistors and means for selectively switching said resistors and said capacitors into the circuit of said astable multivibrator.

5. In an apparatus for balancing a mounted vehicle wheel, wherein a lamp is periodically flashed under control of processing means adapted to integrate, amplify and square an acceleration signal generated by a source cooperating with the wheel, the improvement being that the source comprises:
 sensor means including a first and second elongate flexible strips bearing respective masses at one end and respective strain gages at intermediate positions along their lengths, a plate having two slots at right angles to each other, which receive the opposite ends of the first and second flexible strips, respectively, so that the flexible strips have their longitudinal axes parallel and their planes at right angle to each other, and a casing, which rigidly accommodates the plate and is adapted to be fixed to the suspension of the wheel in such a way that the strips are in predetermined orientation with respect to the wheel at rest; and
 switching means adapted to connect a selected one of the strain gages to the input of the processing means.

* * * * *